Nov. 21, 1933. C. L. WEST Re. 19,008

REFRIGERATING UNIT

Original Filed March 9, 1932 2 Sheets-Sheet 1

INVENTOR.

Constance Lane West.

BY

Acme Allen

ATTORNEY.

Nov. 21, 1933.

C. L. WEST

Re. 19,008

REFRIGERATING UNIT

Original Filed March 9, 1932 2 Sheets-Sheet 2

INVENTOR.

Courtwood Lane West

BY

Geo. R. Allen

ATTORNEY.

Reissued Nov. 21, 1933 Re. 19,008

UNITED STATES PATENT OFFICE 19,008

REFRIGERATING UNIT

Constance Lane West, Detroit, Mich., assignor, by mesne assignments, to The Crosley Radio Corporation, Cincinnati, Ohio, a corporation of Ohio Original No. 1,898,922, dated February 21, 1933, Serial No. 597,714, March 9, 1932. Application for reissue September 21, 1933. Serial No. 690,404

12 Claims. (Cl. 62—89)

This invention relates to a refrigerating unit, and has to do particularly with cabinet construction in combination with a cooling unit of a mechanical refrigerating system for providing additional food space maintained at a temperature different from the normal temperature in the main food compartment.

Heretofore in the fabrication of refrigeration boxes it has been customary to provide an inwardly tapering breaker strip for the box opening which cooperates with an inwardly tapering insulated portion of the door, usually called a pan. In some cases the breaker strip is formed around the pan portion of the door and in other cases is formed both around the opening of the box and around the pan. Regardless of the particular construction it is customary in the standard type of refrigerated box to define one surface of the cubical content capacity of the box by the inner face of the pan.

It is the object of the present invention to replace the standard door with the inwardly extending pan with a door wherein the thickness or insulating part thereof extends outwardly past the flange of the door and the inwardly extending or pan portion is annular in form so as to provide a hollow food space in line with or extending outwardly of the usual breaker strip. One of the objects of this construction is the provision of approximately an extra cubic foot of food space without changing the dimensions of the standard refrigerator box. In other words, the slight bulge on the door will in no way change the space within the kitchen or other room within which the box is designed to fit, so that any standard refrigerator door can be replaced by the door embodying the present invention without any change in the position of the box. Another important feature is the location of the food space at a point relative to the cooling unit whereby the temperatures maintained in this extra food space will be at a higher range than the temperature existing in the refrigerator proper.

Other features of the invention will be brought out in the specification and claims.

In the manufacture of domestic refrigerating cabinets, it is standard practice to locate the cooling unit at some point within the box, or preferably one of the upper corners thereof, so as to induce the positive thermocirculation of the air within the box. The normal circulation of this air is in a plane parallel to the front of the box and while many attempts have been made to attain approximate uniformity of the temperatures at the top and bottom of the box, the bottom of the box is always some cooler than the top.

Figures 2, 3:
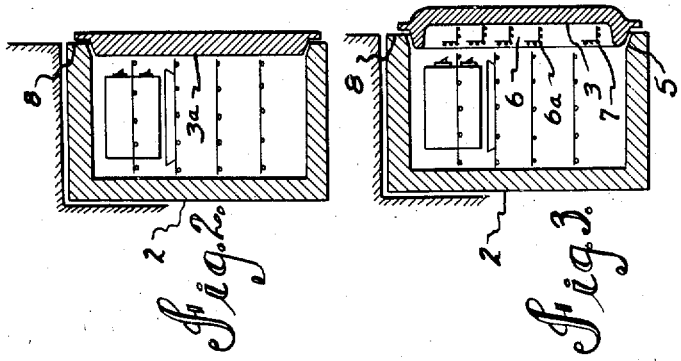
Fig. 2 is a more or less diagrammatic view illustrating the standard refrigerator cabinet illustrating the usual position of the same in connection with the cupboard, and also showing the standard relationship between the insulated part of the door and the breaker strip of the cabinet proper.
Fig. 3 is a view similar to Fig. 2 but showing the door replaced with a door constructed in accordance with the present invention.

It is also customary to set the thermostat or other device so that the temperature at the top of the box is always maintained below a certain point with the result that if the maximum temperature of the box is supposed to be 50° then the bottom of the box will usually be around 45°. Such a standard type of domestic refrigerator box is shown at 2 in Fig. 1. This box is shown combined with the usual cupboard arrangement and is provided with a door 3 having the tapered inwardly extending sides formed by a pan 4 which is designed to closely fit a breaker strip 5. When the door is closed and the portion 4 of the pan cooperates with the breaker strip 5, it will be seen that there will be very little circulation of air past this breaker strip with the result that there will be very little sweating or heat entry at this point. In prior designs, it has been customary to fabricate the door, as shown in Fig. 2, with a relatively thick insulation 3*a* which, of course, corresponds with the insulation around the other walls of the box. By having insulation on all sides of the box, including the door, and by having a relatively close fit between the door pan and the mouth of the box, it will be seen that the food chamber within the box is fairly well insulated from the atmosphere. The illustration in Fig. 2 is more or less diagrammatic, but it will be understood that the construction between the door pan and the breaker strip is substantially as shown in detail in Fig. 1. The door pan may be metal and the interior of the box may be metal and the non-metallic breaker strip may be secured either to the mouth of the box or around the pan of the door or on both.

In order to add additional storage space to a refrigerator box of standard dimensions, I have provided a storage space 6 which is in line with or extends forwardly of the plane of the breaker strip. This door 3, as best shown in Fig. 3, is provided with a flange which may be substantially the same as the flange of the standard door as shown in Fig. 2, but the insulating portion thereof preferably extends in a line with and forwardly of this flange. The inner periphery of the door, however, is provided with an inwardly extending annular portion 4 which corresponds with the inwardly extending portion of the standard door so as to provide means for cooperating with the breaker strip.

Figure 1:
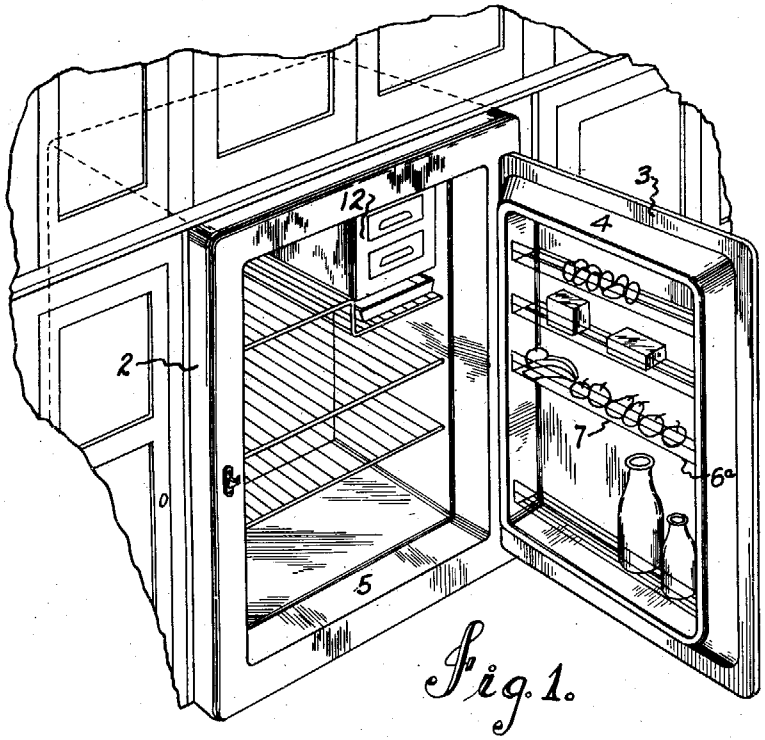
Fig. 1 is a perspective view of a domestic refrigerator box constructed in accordance with the present invention.

In commercially fabricating this door, the entire inner panel of the door may be stamped out as one stamping, as best shown in Fig. 1, but instead of the inner wall of the pan being flat, as shown in Fig. 2, such inner wall is recessed to form the chamber 6 and the annular wall 4 defining the same. Suitable shelves or receptacles 7 may be carried by the struck-in portion of the pan for receiving articles to be cooled. It will be particularly noted that the front edge 8 of the box remains the same in each instance with the result that the novel door, as shown in Figs. 1 and 3, may replace the standard door 3*a*, as shown in Fig. 2, without any change in the box or without changing the location of the box when installed in the home.

Figure 4:
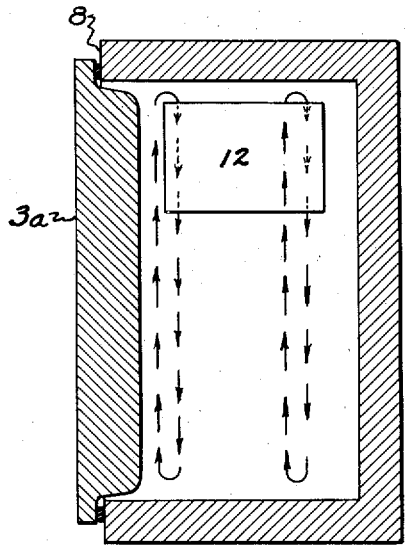
Fig. 4 is a diagrammatic sectional view illustrating the normal path of air circulation created by a cooling unit in a conventional standard refrigerator.
Figure 5:
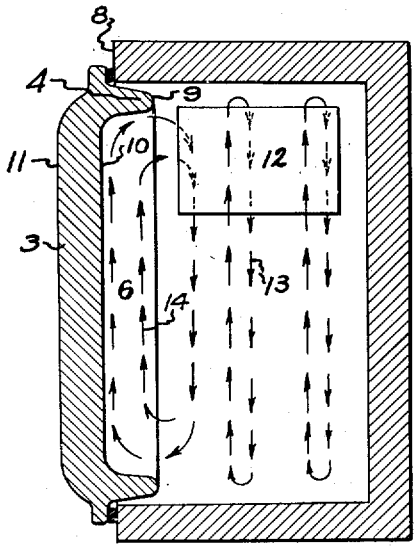
Fig. 5 is a diagrammatic view similar to Fig. 4 illustrating the general path of air circulation when the box is equipped with my novel door structure.

I have found that in the average small sized box of four and five cubic feet that my novel door structure adds approximately one cubic foot to the storage capacity of the box. However, this extra added storage capacity is important not only from the standpoint of storage but from the standpoint that it provides an additional refrigerated area which is maintained at a slightly higher temperature than the corresponding portions of the box proper. Referring to Fig. 5, which is the diagrammatic illustration of a box constructed in accordance with the present invention, it will be seen that the door pan extends inwardly to a point 9 which corresponds to the normal inwardly projecting portion or pan of the standard door. However, the inner portion of this door is recessed to a point 10 which is substantially in alignment with the face 8 of the box or slightly forward thereof. To obtain the necessary insulation, the front of the door 3 is bulged out to a point 11. The cooling unit 12 may be located at the top portion of the box with the result that the thermo-siphon action of the air will be in the direction of the arrows 13 as shown in Figs. 4 and 5.

The food storage space below the cooling unit 12 in the box shown in Fig. 5 will be cooled and maintained at a temperature similar to the storage space below the cooling unit 12 in the standard construction shown in Fig. 4. However, by adding the storage space 6 to the front of the box and in front of the cooling unit 12 it will be seen that the path of circulation will in general be as shown by the arrows 14 in Fig. 5. The rate of circulation here will obviously be somewhat slower than in the box proper and will also contact with the front surface of the cooling unit 12 with the very important result that the cooling portions in the space 6 will be maintained at a slightly higher temperature than the corresponding portions in the box proper. The direct result of this is that many foods which are readily preserved at temperatures higher than those usually maintained in a refrigerator and certain foods which are best preserved at such higher temperatures, may be stored in such added space at the front of the box and all of this without changing the standard dimensions of the box proper.

It will be understood that in recessing the pan portion of the door to provide added storage space maintained at slightly higher temperatures than the box proper, that I obtain novel results which are totally different than the result obtained in those cases where articles to be cooled or the cooling means itself are merely carried by the inner wall of the door, such as shown in the patent to Young No. 940,416 of November 16, 1909.

The added storage space 6 will be found particularly useful in the storing of relatively small articles and for this purpose I have provided racks 6*a* each having a bottom wall and side wall of substantially the same height and the distance between adjacent racks being substantially the same as the height of the individual racks. This will permit of compact and positive storing of small articles and will positively prevent the articles from falling out during the swinging of the door.

What I claim is:

1. In combination with a refrigerator cabinet having insulated walls, and having a breaker strip adjacent the opening thereof, a cooling unit setting up circulation of air in said cabinet, a door having a bulged out portion extending forwardly of the front of the cabinet to provide an additional storage space substantially in alignment with the breaker strip and subject to said air circulation within the cabinet.

2. In combination with a refrigerator cabinet having insulated walls, and having a breaker strip adjacent the opening thereof, a cooling unit setting up a circulation of air in said cabinet, a door having a bulged out portion extending forwardly of the front of the cabinet to provide an additional storage space which extends forwardly of the breaker strip.

3. A domestic refrigerating unit comprising a cabinet of standard construction and of a type having a cooling unit positioned to cause circulation of air within the food chamber as defined by the cabinet, and a door having insulated walls projecting outwardly from the cabinet so as to form an auxiliary insulated food chamber within the door and so positioned relative to the cooling unit as to set up auxiliary air currents which maintain the compartment defined by the door at higher temperature than corresponding parts of the food chamber proper.

4. A domestic refrigerating unit having a cabinet with insulated walls, and a cooling unit positioned to cause circulation of air within the food chamber proper as defined by the side and rear walls of the cabinet, and an auxiliary food chamber formed within the door and subject to the air circulation within the cabinet, and having the inner face of said door substantially flush with the front wall of the cabinet, and the insulated portion of said wall extending beyond the front wall of the cabinet.

5. In a domestic refrigerator of the type having an insulated cabinet and an insulated door, a cooling unit therein setting up circulation of air, the insulated door having a flange cooperating with the cabinet opening, the insulated door being bulged outwardly past the plane of said flange thereby to form additional storage space subject to the air circulation within the cabinet, and an inwardly extending flange disposed angularly with respect to said first-named flange and cooperating with the cabinet opening and defining the side walls of said additional storage space.

6. In a refrigeration cabinet an insulated box portion having a refrigeration unit therein, and a door opening, a door mounted in said opening and having a portion thereof substantially flush with the box walls about the opening so as to permit latching of the door to the box walls, said door being formed with an insulated projecting body extending outwardly of the box from said substantially flush portion to form a compartment within the door, opening into the cabinet, and means for supporting articles to be kept cool within said compartment.

7. In combination with a refrigerator cabinet having insulated walls, means for circulating cold air within the cabinet, a door having an outwardly extending bulged out portion forming additional storage means available to the circulating cold air within the cabinet, and article supporting shelves carried by the door and having vertical front walls, the space between some of the adjacent shelves being close so as to accommodate only small articles.

8. In a refrigerator having insulated walls defining a door opening, and a cooling unit within it, a door having insulated walls of required thickness throughout and arranged to cooperate with said opening, said door walls being bulged outwardly from the plane of the front of the cabinet, leaving an auxiliary food compartment within the door which is subject to cool air circulating within the cabinet, and is located beyond a plane which would interfere with normal shelving within the cabinet.

9. In a domestic refrigerator, a cooling unit in the upper portion of the cabinet for setting up a definite path of refrigerated air in a path at right angles to the door, a breaker strip around the cabinet opening, an auxilairy chamber within the door and in the general plane of the breaker strip, said auxiliary chamber being in front of the cooling unit and substantially the height of the door and so positioned as to set up a slower and auxiliary path of air circulation relative to said main path of air circulation.

10. In a domestic refrigerator, a cabinet, a cooling unit in the cabinet for setting up circulation of refrigerated air therein, said cabinet having insulated walls about the door opening therein, a door having an insulated body hinged to the cabinet so as to abut the front of the cabinet when closed, and having a projecting portion extending into the cabinet when the door is closed, the inner surface of the door being formed outwardly from the inner face of the projecting portion forming a compartment surrounded by the projecting portion, said compartment extending to a point where it opens unrestrictedly on the cooling unit, whereby circulation of refrigerated air is set up in the compartment, and shelves mounted on said door and lying at least in part within the compartment.

11. In a domestic refrigerator, a cabinet, a cooling unit in the cabinet for setting up circulation of refrigerated air therein, said cabinet having insulated walls about the door opening therein, a door having an insulated body hinged to the cabinet so as to abut the front of the cabinet when closed, and having a projecting portion extending into the cabinet when the door is closed, said projecting portion containing insulation, the inner surface of the door being formed outwardly from the inner face of the projecting portion forming a compartment surrounded by the projecting portion, said compartment extending to a point where it opens unrestrictedly on the cooling unit, whereby circulation of refrigerated air is set up in the compartment, and shelves mounted on said door and lying at least in part within the compartment.

12. In a domestic refrigerator, a cabinet, a cooling unit located in the upper portion of said cabinet to set up a circulation of refrigerated air therein, said cabinet having insulated walls about the door opening, a door for said cabinet having an insulated body hinged to the cabinet so as to abut the front of the cabinet when closed, and having a projecting portion extending into the cabinet when closed, the inner surface of the door being formed outwardly from the inner edge of the projecting portion so as to form a compartment surrounded by the projecting portion, said compartment located at least in part below the cooling unit so as to be available to the circulatory air in the cabinet, and shelves mounted on said door and lying at least in part within the cabinet.

CONSTANCE LANE WEST.